(12) United States Patent
Herford

(10) Patent No.: US 6,571,626 B1
(45) Date of Patent: Jun. 3, 2003

(54) FUEL LEVEL SENSOR

(75) Inventor: Monte L. Herford, Grand Rapids, MI (US)

(73) Assignee: Walbro Corporation, Cass City, MI (US)

(*) Notice: Subject to any disclaimer, the term of this patent is extended or adjusted under 35 U.S.C. 154(b) by 0 days.

(21) Appl. No.: 09/975,727

(22) Filed: Oct. 11, 2001

(51) Int. Cl.[7] ............................................. G01F 23/30
(52) U.S. Cl. ................. 73/314; 73/290 R; 73/304 R; 73/305; 73/308
(58) Field of Search ........................... 73/290 R, 305, 73/314, 308, 304 R

(56) References Cited

U.S. PATENT DOCUMENTS

| | | | |
|---|---|---|---|
| 3,377,537 A | * | 4/1968 | Brailsford |
| 3,473,381 A | | 10/1969 | Allen, Jr. ..................... 73/313 |
| 3,976,963 A | | 8/1976 | Kubler ........................ 335/206 |
| 4,384,184 A | | 5/1983 | Alvarez ........................ 200/84 |
| 4,838,083 A | | 6/1989 | Blomquist .................... 73/320 |
| 4,970,896 A | | 11/1990 | Larson et al. ................. 73/320 |
| 4,976,146 A | | 12/1990 | Senghaas et al. ............. 73/313 |
| 5,224,379 A | | 7/1993 | Koebernik et al. ........... 73/308 |
| 5,435,181 A | | 7/1995 | Koebernik .................... 73/313 |
| 5,627,523 A | * | 5/1997 | Besprozvanny et al. ..... 340/623 |
| 6,408,692 B1 | * | 6/2002 | Glahn ........................ 73/313 |

* cited by examiner

Primary Examiner—Helen Kwok
Assistant Examiner—Rodney Frank
(74) Attorney, Agent, or Firm—Reising, Ethington, Barnes, Kisselle & Learman, P.C.

(57) ABSTRACT

A fuel level sensor for use with a vehicle fuel tank includes a magnet carrying float assembly that rises and falls with the fuel level to open and close various magnetically activated reed-switches located at different axial positions along a vertically extending electrical circuit. Activating a reed-switch located at a particular vertical position along the electrical circuit causes the overall resistance of the circuit to depend upon the position of the float assembly. The float assembly is capable of freely rotating about the vertical axis of the electrical circuit and carries magnets producing a horizontal magnetic field that can activate a reed-switch from any angular orientation of the float assembly. Thus, assuming the fuel level sensor is provided with a constant voltage source, the sensor is able to determine the fuel level by the amount of electrical current flowing through the circuit. The electrical current outputted from the sensor is sent to a fuel level gauge which translates the electrical signal into a visual reading, thereby informing an operator of the current fuel level.

15 Claims, 2 Drawing Sheets

FUEL LEVEL SENSOR

FIELD OF THE INVENTION

This invention relates generally to fuel level sensors and, more particularly, to fuel level sensors for use with recreational vehicle fuel tanks, such as those found on snowmobiles, personal watercraft, and motorcycles.

BACKGROUND OF THE INVENTION

Numerous design constraints are imposed upon fuel level sensors, particularly fuel level sensors for use with recreational vehicles. For instance, fuel level sensors must be capable of withstanding corrosive environments, as the sensor is at least partially submerged in fuel and various types of fuel additives throughout its operational life. Also, the sensor is frequently subjected to extreme vibration and shock, elements that are intensified in recreational vehicle applications, particularly those using two-stroke engines. In addition to these requirements, it is desirable that the sensor be of relatively low cost, compact in size, and fairly easy to manufacture and package. Traditionally, two primary fuel level sensor designs have been employed to address the aforementioned needs. The first entails a purely mechanical design while the second utilizes magnetically activated reed-switches.

The purely mechanical fuel level sensor generally includes a float, a spiral strip of metal, and a fuel gauge. In operation, the float moves according to the fuel level in a vertical direction along the spiral strip of metal, which is attached to an indication needle of the fuel gauge. As the fuel level rises and lowers, the float causes the strip of metal to turn, thus moving the indication needle of the fuel gauge and informing the operator of the current fuel level.

The reed-switch type fuel level sensor, on the other hand, typically includes an elongated circuit board containing a series of reed-switches and resistors and is encapsulated by a protective housing that is partially surrounded by a float having a magnetic component. The encapsulated circuit board is generally aligned in a vertical orientation, such that a change in the fuel level causes the float to move up and down along the circuit. As the magnet carrying float vertically moves along the circuit, reed-switches located at various vertical positions are activated and deactivated. Interspersed between these reed-switches are resistors, all of which are connected in series and help form a complete current path. When the fuel level is at a half of a tank, for example, the magnet carried by the float activates a reed-switch located at an equivalent vertical position. Activating that reed-switch causes the resistors located below the switch to be shorted. Therefore, assuming a constant voltage source, the amount of electrical current through the circuit is related to the number of series connected resistors that it flows through, and thus is related to the fuel level. Numerous fuel level sensors employ a magnet carrying float and reed-switches, including the sensors disclosed in U.S. Pat. Nos. 4,976,146 and 4,384,184.

The '146 patent discloses a reed-switch style liquid level sensor having a plurality of reed switches that are overlapping, vertically spaced apart, and are slightly inclined to the vertical axis. A digital driver circuit is connected to each reed-switch and an electrical readout is connected to each digital driver such that the readout expresses the current liquid level within a resolution corresponding to half the distance between spaced apart reed-switches. Though the sensor seen in the '146 patent utilizes reed-switches for determining liquid levels, that design does not disclose the use of series connected resistors nor non-overlapping reed-switches.

The fuel level sensor seen in the '184 patent reduces the number of reed-switches by utilizing a non-overlapping reed-switch configuration. The reed-switches of this design are laid out in a vertical, non-overlapping orientation and are wired in a generally parallel manner. Activation of one of the reed-switches does not short resistors further down the circuit board, as described above. Rather, each reed-switch is electrically connected to a terminal such that activation of one of the reed-switches connects the appropriate terminal to power, thereby driving an indicator lamp or some other type of electrical device. The reed-switches are encapsulated in a first tube filled with a spark suppressing inert gas, the tube is then surrounded with a dielectric oil, and the entire device is enclosed in a second protective tube.

Thus, it would be advantageous to provide a fuel level sensor that utilized series connected resistors and magnetically activated switches in order to provide an accurate, compact, and rugged fuel level sensor.

SUMMARY OF THE INVENTION

In accordance with the present invention, there is provided a fuel level sensor for use in a vehicle fuel tank that comprises an electrical circuit, an elongated housing surrounding the electrical circuit, and a float assembly. The electrical circuit is elongated, extends in a vertical direction, and has a plurality of series connected resistors and a plurality of magnetically activated switches. The switches are located at various axial positions along the electrical circuit and are connected between two of the resistors at one end and a common node at the other end. The float assembly includes at least one magnet and surrounds a segment of the housing such that the float assembly is capable of freely rotating about the housing and vertically moving along the housing according to the fuel level in the fuel tank. Further, the magnet(s) is oriented such that it is capable of activating each of the switches from any angular orientation of the float assembly relative to the housing.

In accordance with another aspect of the present invention, there is provided a fuel level monitoring system for use in a vehicle that comprises a battery, a vehicle fuel tank, a fuel level sensor, and a fuel gauge. The fuel level sensor is located within the fuel tank, is coupled to the battery such that it receives a first signal, and comprises an elongated electrical circuit, an elongated housing surrounding the circuit, and a float assembly. The electrical circuit extends in a vertical direction and has a plurality of series connected resistors and a plurality of magnetically activated switches. The switches are located at various axial positions along the electrical circuit and are connected between two of the resistors at one end and a common node at the other end. The float assembly includes at least one magnet and surrounds a segment of the housing and is freely rotateable about the housing such that the magnet(s) is capable of activating each of the switches from any angular orientation of the float assembly relative to the circuit. Also, the float assembly is vertically moveable along the housing according to the fuel level in the fuel tank. The fuel level sensor utilizes the first signal to produce a second signal representative of the fuel level, and the fuel gauge is coupled to the fuel level sensor for receiving the second signal. Thus, the fuel gauge is capable of utilizing the second signal to inform an operator of the fuel level.

Objects, features, and advantages of this invention include providing a fuel level sensor that utilizes a freely rotatable, magnet carrying float assembly to activate reed-switches located at various axial positions along an elongated circuit such that activation of the switches is independent of the angular orientation of the float assembly with respect to the circuit, wherein the fuel level sensor is compact in size, is of a rugged design for use in recreational vehicle applications, and is of relatively simple design, economical manufacture and assembly and has a long and useful life in service.

BRIEF DESCRIPTION OF THE DRAWINGS

These and other objects, features and advantages of the present invention will be apparent from the following detailed description of the preferred embodiment, the appended claims, and the accompanying drawings in which:

DESCRIPTION OF THE PREFERRED EMBODIMENT

Figure 1:
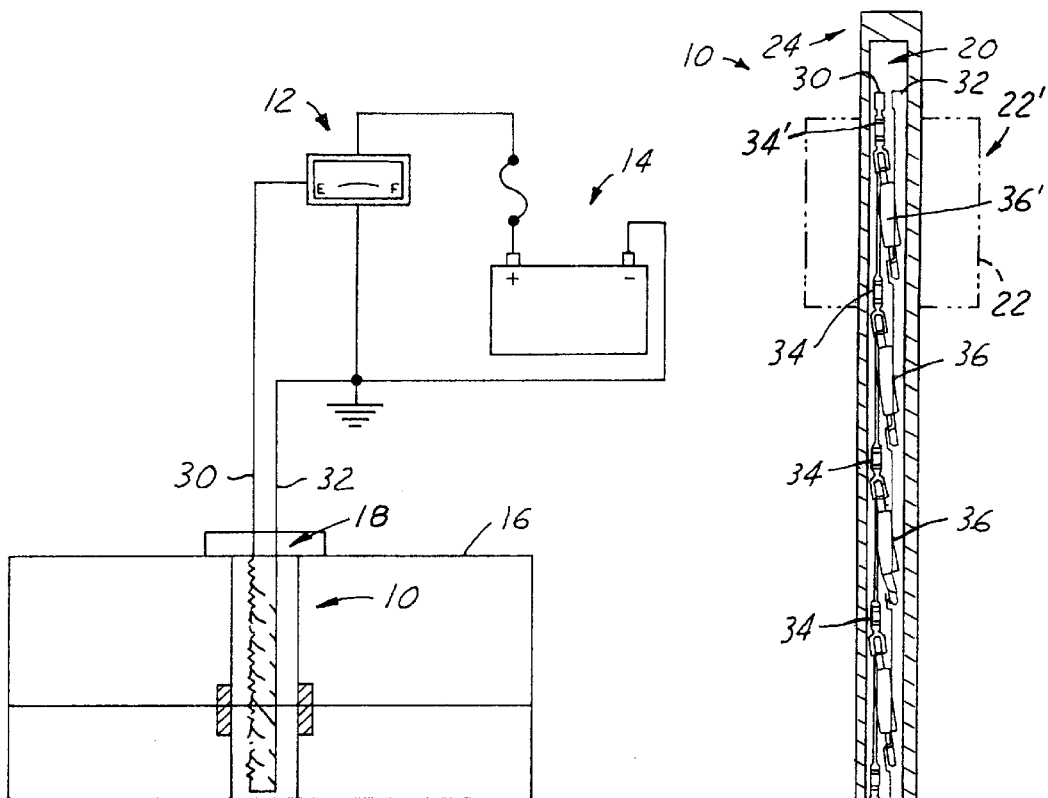
FIG. 1 is a block diagram of a fuel level monitoring system employing the fuel level sensor of the present invention.

With reference to FIG. 1, there is shown a fuel level monitoring system which includes a fuel level sensor 10, a fuel gauge 12, a battery 14, and a fuel tank 16. The fuel level sensor of the present invention is electrically coupled to the fuel gauge and the battery such that the output of the sensor, which is indicative of the relative fuel level within the tank, is communicated to an operator via the gauge. Fuel level sensor 10 extends into fuel tank 16 through an existing fuel pump assembly opening 18 in the fuel tank, thus saving space and expense by not requiring the creation of a separate opening. In order to utilize the same opening, the fuel level sensor of the present invention may either be incorporated into the fuel pump assembly itself or can extend into the tank such that it is independent from the fuel pump. Seen best in FIG. 2, the fuel level sensor 10 generally comprises an elongated electrical circuit 20, which includes an alternating arrangement of resistors and magnetically activated switches, and a float assembly 22. The electrical circuit is a vertically oriented circuit generally structured as a resistive ladder, wherein one leg of the ladder includes a sequence of series connected resistors, the other leg is a common ground terminal, and the rungs of the ladder are axially separated and each comprises a magnetically activated reed-switch. The entire electrical circuit is encased in a protective housing 24 that extends the length of the circuit and protects the circuit from the harsh environment existing within the fuel tank. The float assembly 22 is a cylindrical component having a hollowed axial bore that is designed to slidingly surround the protective housing such that it is capable of freely sliding up and down the housing and rotating about the housing. The float assembly rises and falls with the fuel level and is designed to carry one or more magnets capable of activating the ladder rung reed-switches located at various heights along the electrical circuit. Accordingly, as the fuel level declines, the float assembly slides down the elongated circuit such that the magnets activate and deactivate reed-switches located at corresponding axial heights. Activation causes the reed-switch to close, thereby closing one rung of the ladder and electrically shorting any resistors located further down the ladder leg. Assuming the application of a constant voltage, the amount of electrical current flowing through the circuit is thus dependent upon the particular reed-switch that is closed, therefore, the fuel level within the tank can be determined by sensing the total amount of electrical current through the circuit.

The fuel level sensor of the present invention will now be discussed in further detail. Electrical circuit 20 is an elongated circuit board that extends in a vertical direction and generally includes a positive terminal 30, a common ground terminal 32, resistors 34 and reed-switches 36. The vertical orientation of the electrical circuit must be such that a float assembly, as previously mentioned, is capable of freely moving up and down the circuit in connection with the fuel level. The circuit is a printed circuit comprised of either a rigid or flexible substrate, preferably 0.010"–0.062" thick, and is capable of receiving electrical components according to surface mounting techniques, as is commonly known in the art. The use of surface mounting techniques to attach electrical components to circuit boards avoids the need for additional drilling operations and makes the entire process more adept to automation. Positive terminal 30 provides the fuel level sensor 10 with a constant voltage source, typically 8–14 V, while terminal 32 provides the sensor with a common ground. The entire electrical circuitry is protected from vibration and shock, as well as from fuel, by covering the circuitry with a potting compound or some form of protective coating. The utilization of a potting compound involves immersing the circuit in a bulk material using a removable or fixed mold. Typically, the specific potting compound is selected according to characteristics such as moisture or chemical resistance as well as protection against high voltage breakdown, all of which is commonly known in the art.

As seen, resistors 34 and reed-switches 36 are affixed to the circuit in an alternating adjacent sequence, such that each reed-switch is separated from an adjacent reed-switch by a resistor. The resistors utilized in the preferred embodiment are very small in size and are of the surface mount variety, thus being less expensive than the non-surface mount variety in that they do not require a separate drilling operation in order to mount them to the electrical circuit. The resistors of the preferred embodiment all have the same resistance, however, in an alternative embodiment their resistance could vary. Appropriate reed-switches include the Mini-DYAD® series switches from Sumida America™, formerly CP Clare®; however, other small magnetically operated switches may be employed. The reed-switches of the preferred embodiment are mounted to circuit 20 such that they are slightly inclined with respect to the vertical axis of the circuit, thus differing from many prior art designs which incorporate either horizontally oriented or vertically oriented reed-switches. This generally vertical orientation does, however, affect operational characteristics of the switches.

Figure 3A:
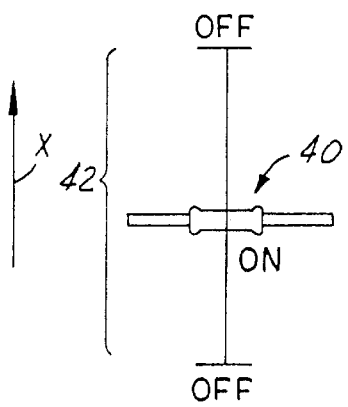
FIG. 3a shows a reed-switch in a horizontal orientation that is perpendicular to the direction of movement of a magnet.
Figure 3B:
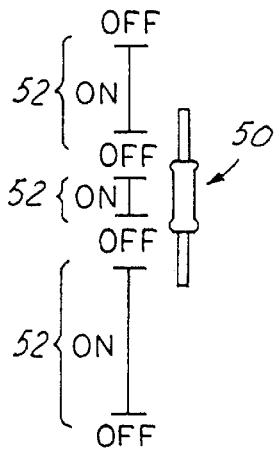
FIG. 3b shows a reed-switch in a vertical orientation that is parallel to the direction of movement of a magnet.
Figure 3C:
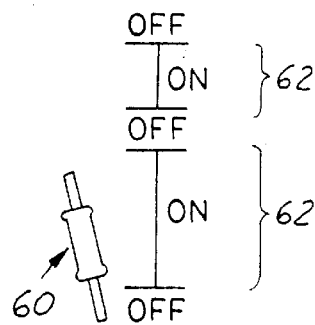
FIG. 3c shows a reed-switch in an orientation slightly inclined with respect to the direction of movement of a magnet.

For example, referring now to FIG. 3a, there is seen a horizontally oriented reed-switch 40 positioned such that a magnet moves by the switch in a direction X, which is perpendicular to the axis of the reed-switch. In this configuration, the reed-switch only has a single activation range 42, which is the range wherein the magnet will activate, or close, the switch such that the switch is in an "on" position. This single-range arrangement is preferable because the switch does not flip-flop back and forth as the float assembly, and hence the magnet, moves past the reed-switch. FIG. 3b, on the other hand, shows a vertically oriented reed-switch 50 wherein a ring shaped magnet could have as many as three activation ranges 52. A reed-switch having this many activation ranges has the undesirable consequence that the switch will close, thereby turning it "on", three separate times as a ring-shaped magnet moves past the switch. Lastly, referring to FIG. 3c, reed-switch 60 of the preferred embodiment is slightly inclined with respect to the vertical and when used in conjunction with the magnets of the preferred embodiment, two activation ranges 62 are formed. The orientation of the slightly inclined reed-switch 60 was chosen to minimize the width of electrical circuit 20, wherein the width of the circuit is proportional to the amount of horizontal orientation of the reed-switch, while at the same time minimizing the number of activation ranges per switch; goals that go toward achieving a compact, yet smoothly operating sensor.

Figure 4:
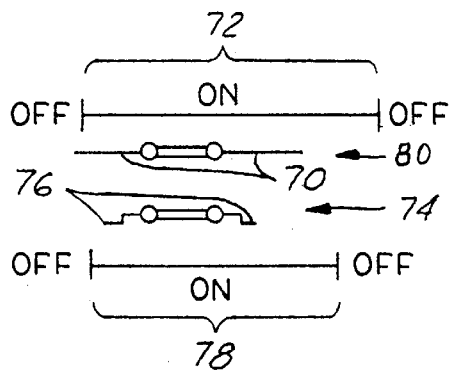
FIG. 4 shows a reed-switch having unclipped leads versus one having clipped leads and their respective activation ranges.

Referring now to FIG. 4, a preferred reed-switch embodiment 80 having full, unclipped terminal leads 70 is shown. The long, unclipped leads 70 extend from the reed-switch such that they increase its sensitivity, thereby expanding the length of activation range 72. This unclipped design is contrasted with reed-switch 74 which has terminal leads that have been clipped or otherwise shortened, thereby decreasing the length of its activation range 78. Increasing the length of an activation range where a magnet can cause a switch to close or turn "on", reduces the total number of switches required and hence decreases the cost of the sensor. The maximum distance that one switch may be separated from an adjacent switch is dependent, amongst other things, upon the length of the activation ranges, the strength of the magnets involved, the size of the electrical circuit, and the amount of resolution required. As will be subsequently elaborated in further detail, it is important for the smooth operation of the sensor, that as the magnet carrying float assembly 22 moves into a reed-switch activation range that the previously activated reed-switch stays on until the newly activated reed-switch is also on. Therefore, even though adjacent reed-switches themselves do not axially overlap, their activation ranges do. This overlapping of activation ranges guarantees that once the float assembly has sunk beneath the topmost resistor 34', at least one reed-switch will always be activated at any given moment. Using the components of the preferred embodiment, there should be approximately a 0.030"–0.040" gap between switches. Generally speaking, the closer the reed-switches are axially located to each other, the more resolution the fuel level sensor has.

Referring again to FIG. 2, it should be pointed out that the electrical circuit 20 forms a complete current path. That is, this path begins with positive terminal 30, continues through all of the series connected resistors, and finally makes contact with ground terminal 32 near the bottom of circuit 20. Interspersed along this path are the reed-switches, if any one of these switches has been activated and is "on", that reed-switch shorts any resistors located below that switch on the circuit. Thus, a shortened, less-resistive complete electrical path is formed through positive terminal 30, continues through how ever many resistors are located above the activated reed-switch, the activated reed-switch, and ground terminal 32. Alternatively, circuit 20 could be constructed such that the leg of the ladder beginning with positive terminal 30 and having the various resistors is not electrically connected to ground terminal 32 at the bottom of the circuit. In this embodiment, the various reed-switches are the only means for coupling positive terminal 30 with ground terminal 32, and in the absence of any activated reed-switch the circuit would appear as an open circuit with no appreciable current flowing through it.

Figure 5:
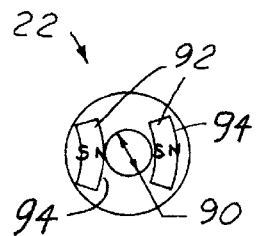
FIG. 5 is a diagrammatic top-down view of a first embodiment of the float assembly seen in FIG. 2.
Figure 2:
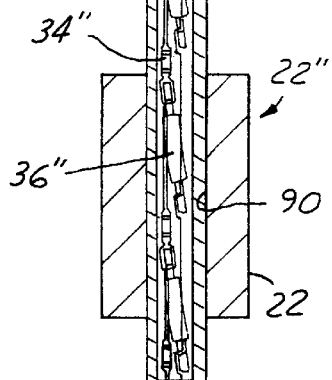
FIG. 2 is a side view of a preferred embodiment of the fuel level sensor of the present invention.

Referring now to FIGS. 2 and 5, the float assembly 22 of the present invention is a hollowed cylindrical device having an axial bore 90 sized such that the float is capable of sliding up and down protective housing 24 and is also capable of freely rotating about the axis of the housing. The float assembly is comprised of a fuel-resistant buoyant material such that it is able to keep itself and several magnets afloat within the fuel tank. Accordingly, as the fuel level within the tank goes down, the float assembly slides down the protective housing, and as the fuel level within the tank increases the float assembly moves up the protective housing. In the preferred embodiment, the float is composed of nitrophyl, has an outer diameter of 0.900", and an axial length of 1.500". However, it should be noted, the size of the float is dependent upon the weight of the magnets and the size of the protective housing, and thus could differ from those dimensions previously specified. The following formula can be used to determine the minimum size of a float that would be needed in order to support the weight of a certain magnet:

$$F_{buoyant} = [(V_{float})*(\rho_{float})*(g)] - W_{magnet} - W_{float}$$

Wherein, $F_{buoyant}$ is the buoyant force of the float, $V_{float}$ is the volume of the float, $\rho_{float}$ is the density of the fluid the float will displace (gasoline), g is the gravitational constant (9.807 m/s$^2$ or 32.17 ft/s$^2$), and W is the weight of the object (weight=mass*gravity). As shown by the above formula, it is important to utilize a light-weight float material, for the lighter the float material, the smaller the volume the float must occupy in order to support the weight of the magnets. Minimizing the size of the float contributes to the stated goal of reducing the size of the sensor. Also, it is important to shape the float such that its design will not bind and get stuck while moving along the vertical axis of the circuit.

The magnets 92 are important to the proper functioning of the fuel level sensor and are chosen such that their strength, orientation, and size properly activate the various reed-switches. The magnets of the preferred embodiment are generally curved magnetic components that are approximately 0.250" in width (referring to FIG. 5, width is the arcuate extent along the outside radius 94 of each magnet), are aligned in a parallel orientation, and produce a horizontal magnetic field. It is important that the magnetic field produced by the magnets activates a reed-switch located at a proximate axial position, regardless of the angular orientation of the float assembly with respect to the circuit. Thus, the float assembly is free to rotate about the axis of the protective housing 24 without requiring the assistance of an additional guide for keeping the float, and hence the magnets, at a particular angular orientation. Various magnet shapes and orientations, including variations not specifically shown in the Figures, are envisioned by the present invention.

Figure 6A:
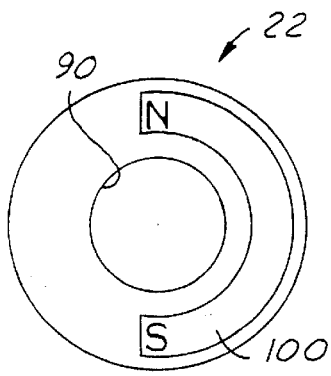
FIG. 6a is a diagrammatic top-down view of a second embodiment of the float assembly seen in FIG. 2.
Figure 6B:
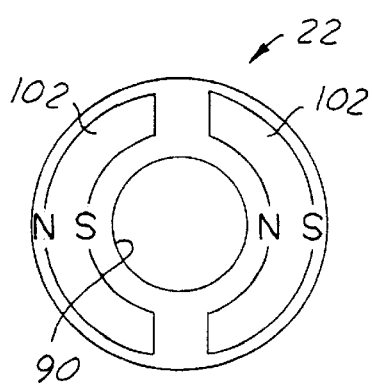
FIG. 6b is a diagrammatic top-down view of a third embodiment of the float assembly seen in FIG. 2.
Figure 6C:
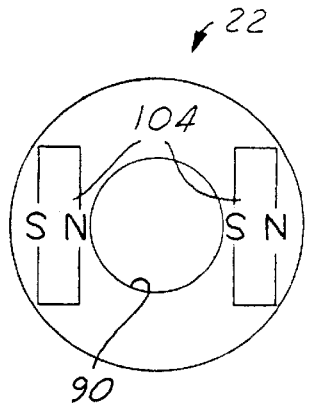
FIG. 6c is a diagrammatic top-down view of a fourth embodiment of the float assembly seen in FIG. 2.

For instance, referring now to FIGS. 6a–c, there is seen three alternative embodiments for the magnet design. FIG. 6a shows a single magnet 100 having north and south poles lined up in opposing fashion such that they are separated by approximately 180° and produce magnetic field lines that cross the center of axial bore 90. FIG. 6b, on the other hand, shows a float assembly 22 having a pair of curved magnets 102 wherein the magnets open towards each other. Again, the north and south poles of the magnets are designed such that they produce field lines which cross through the center of axial bore 90. The magnets seen in the embodiment of FIG. 6c are straight magnetic components 104, a variation of the curved magnet designs previously discussed. An important factor behind each of these magnet configurations is to produce a magnetic field having a concentration of magnetic field lines passing through the axial bore of the float assembly such that the field is generally perpendicular to axis of the reed-switch. Also, it is important that the magnetic field created is symmetrical with respect to the vertical axis of the protective housing 24, therefore, the magnets will be able to activate the reed-switch in a similar manner from all angular orientations.

In operation, the fuel level sensor 10 of the present invention utilizes a magnet carrying float assembly 22 that rises and falls with the fuel level to open and close various magnetically activated reed-switches located at different axial positions along a vertically oriented resistive circuit board 20. Activating a reed-switch located at a particular vertical position along the electrical circuit causes the overall resistance of the circuit to depend upon the position of the float assembly. Thus, assuming the fuel level sensor is provided with a constant voltage source, the sensor is able to determine the fuel level by the amount of electrical current flowing through the circuit. The electrical current outputted from the sensor is sent to a fuel level gauge 12 which translates the electrical signal into a visual reading, thereby informing an operator of the current fuel level.

Referring again to FIG. 2, there is seen the fuel level sensor of the present invention wherein the float assembly 22 is at a first position 22' (seen in phantom) located towards the top of the electrical circuit 20, thus indicating a full fuel tank. When the float assembly is in a position such as 22', the magnets being carried by the float assembly produce a magnetic field that activates a near by reed-switch, such as reed-switch 36', which is equivalent to the reed-switches 36 previously described. Activation of reed-switch 36' closes the switch, thereby establishing an electrical connection from the lower terminal of resistor 34' to ground terminal 32, which in effect shorts all of the resistors located further down the circuit from resistor 34'. Accordingly, the total equivalent resistance of the electrical circuit is the resistance of resistor 34', and assuming a constant voltage source is being applied across terminals 30 and 32, a predetermined amount of electrical current can be expected to flow through the electrical circuit. That current is sent to fuel gauge 12, seen in FIG. 1, which acts as an ammeter and thus translates the amount of electrical current into a visual gauge reading. As the fuel level decreases, the float assembly descends along with it until reaching a position such as 22", seen towards the bottom of the circuit. When the float assembly is in a position such as this, the magnets being carried cause a reed-switch located at an equivalent axial position, such as reed-switch 36", to close, thereby connecting the lower terminal of resistor 34" with ground terminal 32. In this scenario, the lowermost resistor is shorted thus causing the overall resistance of the circuit board to be equal to the summation of the individual resistances of all of the series connected resistors, minus the two remaining resistors located beneath resistor 34". As should be apparent, the overall resistance of the electrical circuit is much greater when the fuel tank is low and the float assembly is located towards the bottom of the circuit, thus causing the electrical current through the circuit to be much less.

It will thus be apparent that there has been provided in accordance with the present invention a fuel level sensor for use in a vehicle fuel tank which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For instance, instead of the fuel level sensor of the present invention being provided with a constant voltage source and the fuel gauge measuring current, the sensor could be provided with a constant current source and the fuel gauge would measure the voltage across the terminals. All such variations and modifications are intended to come within the spirit and scope of the appended claims.

What is claimed is:

1. A fuel level sensor for use in a vehicle fuel tank, comprising:
   an elongated electrical circuit extending in a vertical direction and having a plurality of series connected resistors and a plurality of magnetically activated switches, said switches being located at various axial positions along said electrical circuit, being oriented at a slight angle with respect to the vertical direction, and being connected between two of said resistors at one end and a common node at the other end,
   an elongated housing surrounding said electrical circuit, and
   a float assembly including at least one magnet, with said float assembly surrounding a segment of said housing and said float assembly and said at least one magnet being freely rotatable about said housing and vertically movable along said housing according to the fuel level in the fuel tank, wherein said magnet(s) is oriented such that it is capable of activating each of said switches from any angular orientation of said float assembly relative to said housing.

2. The fuel level sensor of claim 1, wherein, assuming a fixed voltage is applied to said sensor, activation of one of said switches causes said circuit to electrically short at least one of said resistors thus reducing the overall resistance of said circuit and increasing the electrical current through said circuit.

3. The fuel level sensor of claim 2, wherein said sensor determines the fuel level by sensing the amount of electrical current through said circuit.

4. The fuel level sensor of claim 1, wherein said plurality of resistors and switches are mounted to the surface of said electrical circuit.

5. The fuel level sensor of claim 1, wherein said electrical circuit is of the analog type.

6. The fuel level sensor of claim 1, wherein said float assembly includes first and second magnets and said housing extends through said float assembly with a segment of said housing being located between said first and second magnets.

7. The fuel level sensor of claim 6, wherein said first and second magnets are curved such that they open in the same direction.

8. The fuel level sensor of claim 6, wherein said first and second magnets create a magnetic field that is transverse to the longitudinal axis of said housing and passes through said housing.

9. The fuel level sensor of claim 1, wherein said magnetically activated switches are normally in the "open" state.

10. The fuel level sensor of claim 1, wherein said magnetically activated switches are spaced such that they are non-overlapping.

11. The fuel level sensor of claim 1, wherein the vehicle fuel tank is a recreational vehicle fuel tank.

12. The fuel level sensor of claim 11, wherein said sensor extends into the fuel tank through the same opening that is used by a fuel pump assembly.

13. A fuel level sensor for use in a recreational vehicle fuel tank, comprising:
- an elongated electrical circuit extending in a vertical direction and having a plurality of surface mounted, series connected resistors and a plurality of magnetically activated switches, said switches being aligned in a non-overlapping orientation that is at a slight angle with respect to the vertical direction, said switches being located at various axial positions along said electrical circuit, and said switches being connected between two of said resistors at one end and a common node at the other end,
- an elongated housing surrounding said electrical circuit, and
- a float assembly that surrounds a segment of said housing and includes first and second magnets that produce a horizontal magnetic field, wherein said float assembly is capable of freely rotating about said housing and vertically moving along said housing according to the fuel level such that said horizontal magnetic field is capable of activating each of said switches from any angular orientation of said float assembly relative to said housing.

14. A fuel level monitoring system for use in a vehicle, comprising:
- a battery,
- a vehicle fuel tank,
- a fuel level sensor located within said fuel tank and coupled to said battery for receiving a first signal, comprising:
  - an elongated electrical circuit extending in a vertical direction and having a plurality of series connected resistors and a plurality of magnetically activated switches, said switches being located at various axial positions along said electrical circuit, being oriented at a slight angle with respect to the vertical direction, and being connected between two of said resistors at one end and a common node at the other end,
  - an elongated housing surrounding said electrical circuit,
  - a float assembly including at least one magnet, with said float assembly surrounding a segment of said housing and being freely rotatable about said housing such that said magnet(s) is capable of activating each of said switches from any angular orientation of said float assembly relative to said housing and said float assembly being vertically movable along said housing according to the fuel level in the fuel tank, wherein, said fuel level sensor utilizes said first signal to produce a second signal representative of the fuel level, and
- a fuel gauge coupled to said fuel level sensor for receiving said second signal, wherein said fuel gauge is capable of utilizing said second signal to inform an operator of the fuel level.

15. A fuel level sensor for use in a vehicle fuel tank, comprising:
- an elongated electrical circuit extending in a vertical direction and having a plurality of series connected resistors and a plurality of magnetically activated switches, said switches having non-trimmed terminals such that they are more sensitive, being located at various axial positions along said electrical circuit, and being connected between two of said resistors at one end and a common node at the other end,
- an elongated housing surrounding said electrical circuit, and
- a float assembly including at least one magnet, with said float assembly surrounding a segment of said housing and being freely rotatable about said housing and vertically movable along said housing according to the fuel level in the fuel tank, wherein said magnet(s) is oriented such that it is capable of activating each of said switches from any angular orientation of said float assembly relative to said housing.

* * * * *